(No Model.)

C. M. RICHMOND.
ARTIFICIAL DENTURE.

No. 277,938. Patented May 22, 1883.

UNITED STATES PATENT OFFICE.

CASSIUS M. RICHMOND, OF NEW YORK, N. Y., ASSIGNOR TO THE RICHMOND TOOTH CROWN COMPANY, OF SAME PLACE.

ARTIFICIAL DENTURE.

SPECIFICATION forming part of Letters Patent No. 277,938, dated May 22, 1883.

Application filed December 2, 1882. (No model.)

*To all whom it may concern:*

Be it known that I, CASSIUS M. RICHMOND, of the city, county, and State of New York, have invented a new and useful Improvement in Artificial Dentures, of which the following is a full, true, and exact description, reference being had to the accompanying drawings.

My invention relates to a new and useful method of preparing artificial tooth-crowns for application to prepared roots, and a new and useful process or operation for applying the same.

I have heretofore, on the 10th day of February, 1880, obtained Letters Patent of the United States, No. 224,355, for a method of applying artificial tooth-crowns, and the present invention relates to another method of applying the same.

Figure 1:
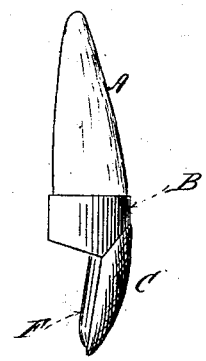
Figure 2:
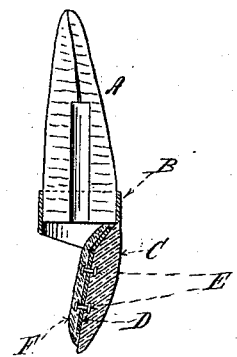

My invention will be readily understood from the accompanying drawings, in which Figure 1 represents an elevation, and Fig. 2 a section, of the root, ferrule, and tooth-crown.

A represents a prepared root. The lower part of said root should be shaped and prepared as previously described by me, with the natural terminal contour near the gum, and the ferrule B should be properly fitted and applied thereto. The front of this ferrule should be beveled, as shown in Fig. 1. The crown C is then prepared as follows: A backing, D, of metal—such as platinum—is fitted to the back of the crown, allowing the pins E to project through it. Upon the back of this a layer of gold solder is placed. Said surface is shown at F. This solder will surround the heads of the pins E and secure the backing D firmly against the tooth-crown C. The crown is then firmly soldered by the backing-plate D against the ferrule B, all said work being done, of course, outside of the mouth. The artificial tooth-crown may then be put in position on the root, and the space between the root and the solder F be filled with some plastic material or gold in the ordinary way. A pin may be first inserted into the prepared hole in the root and the gold or plastic material packed around said pin, thereby insuring a firmer hold; or said hole may be otherwise filled.

What I claim as my invention, and desire to secure by Letters Patent, is—

1. The method of preparing an artificial denture, which consists in suitably preparing a root for the reception of a surrounding ferrule, retaining the natural terminal contour near the gum, in placing upon the back of a suitable tooth-crown a backing of platinum or other suitable metal, and in soldering said backing to the tooth-crown by means of pins or clamps projecting through said backing, and to the ferrule, substantially as described.

2. The method of preparing an artificial denture, which consists in suitably preparing a root for the reception of a surrounding ferrule, in placing upon the back of a suitable tooth-crown a backing of platinum or other suitable metal, in soldering said backing to the tooth-crown by means of pins or clamps projecting through said backing, and to the ferrule, in placing said prepared crown upon the tooth, and in connecting the root with the crown, substantially as described.

C. M. RICHMOND.

Witnesses:
GEO. H. EVANS,
ANTHONY GREF, Jr.